(12) United States Patent
Causer (10) Patent No.: US 8,276,289 B2
(45) Date of Patent: Oct. 2, 2012

(54) SYSTEM AND METHOD FOR PREPARATION OF SOLID BIOMASS BY TORREFACTION

(75) Inventor: Thomas P. Causer, Smethport, PA (US)

(73) Assignee: Terra Green Energy, LLC, Smethport, PA (US)

( * ) Notice: Subject to any disclaimer, the term of this patent is extended or adjusted under 35 U.S.C. 154(b) by 223 days.

(21) Appl. No.: 12/731,253

(22) Filed: Mar. 25, 2010

(65) Prior Publication Data

US 2010/0242351 A1    Sep. 30, 2010

Related U.S. Application Data (60) Provisional application No. 61/164,103, filed on Mar. 27, 2009.

(51) Int. Cl.
  *F26B 11/00*  (2006.01)
(52) U.S. Cl. .......... 34/90; 34/138; 34/210; 202/95; 202/117; 44/605; 44/606; 423/445 R; 122/22
(58) Field of Classification Search ............ 34/380, 34/381, 413, 497, 524, 90, 138, 210; 423/445 R; 202/95, 117; 44/605, 606
See application file for complete search history.

(56) References Cited

U.S. PATENT DOCUMENTS

| | | | |
|---|---|---|---|
| 864,186 A | 8/1907 | Ostertag | |
| 1,172,576 A | 2/1916 | Benjamin | |
| 2,159,027 A | 5/1939 | Jalma et al. | |
| 2,869,249 A | 1/1959 | Kamp | |
| 2,903,400 A | 9/1959 | Poindexter et al. | |
| 2,913,780 A | 11/1959 | Weisselberg | |
| 3,681,855 A | 8/1972 | Weisselberg et al. | |
| 3,728,797 A | 4/1973 | Worden, Sr. et al. | |
| 3,777,409 A | 12/1973 | Weisselberg et al. | |
| 3,787,292 A * | 1/1974 | Keappler | 202/118 |
| 4,077,847 A * | 3/1978 | Choi et al. | 201/21 |
| 4,098,649 A * | 7/1978 | Redker | 201/2.5 |
| 4,285,773 A | 8/1981 | Taciuk | |

(Continued)

FOREIGN PATENT DOCUMENTS

BE    444413 A    2/1942

(Continued)

OTHER PUBLICATIONS

Prins et al., Energy, 31; 3458-3470 (2006).

(Continued)

*Primary Examiner* — Stephen M. Gravini
(74) *Attorney, Agent, or Firm* — Duane Morris LLP (57) ABSTRACT

Methods and systems for preparing a torrefied biomass fuel are disclosed. Moisture is initially extracted from relatively wet biomass fuel to produce a relatively dry biomass fuel. Remaining moisture is then extracted from the relatively dry biomass fuel in a final drying stage, using steam at a temperature of about 900° F. The resulting dried biomass fuel is conveyed downward using gravity and undergoes torrefaction, which produces torrefied biomass fuel and torrefaction gases. A gaseous mixture of steam and torrefaction gases is vented to a heat exchanger, where the gaseous mixture is heated by a flue gas, and the heated gaseous mixture is used to support the extraction of the remaining moisture in the final drying stage and to support the torrefaction of the dried biomass fuel. Embodiments disclosed herein efficiently use available energy resources to the benefit of manufacturers, consumers, and the environment.

7 Claims, 5 Drawing Sheets

U.S. PATENT DOCUMENTS

| | | | |
|---|---|---|---|
| 4,787,917 A | 11/1988 | Leclerc de Bussy | |
| 5,017,269 A * | 5/1991 | Loomans et al. | 201/25 |
| 5,183,148 A | 2/1993 | Kondo | |
| 5,279,712 A | 1/1994 | Constantine | |
| 5,725,738 A | 3/1998 | Brioni et al. | |
| 6,048,374 A | 4/2000 | Green | |
| 6,558,644 B1 * | 5/2003 | Berman | 423/445 R |
| 6,588,349 B1 | 7/2003 | Ahtila et al. | |
| 7,159,723 B2 | 1/2007 | Hilpert et al. | |
| 8,061,140 B2 | 11/2011 | Harmon, Sr. | |
| 8,105,400 B2 * | 1/2012 | Bergman | 44/605 |
| 2003/0221363 A1 | 12/2003 | Reed | |
| 2004/0220435 A1 | 11/2004 | Stubbing | |
| 2006/0130396 A1 | 6/2006 | Werner | |
| 2006/0280669 A1 | 12/2006 | Jones | |
| 2007/0084385 A1 | 4/2007 | Lana et al. | |
| 2007/0220805 A1 | 9/2007 | Leveson et al. | |
| 2007/0266623 A1 | 11/2007 | Paoluccio | |
| 2008/0201980 A1 | 8/2008 | Bullinger et al. | |
| 2008/0223269 A1 | 9/2008 | Paoluccio | |
| 2009/0007484 A1 | 1/2009 | Smith | |
| 2009/0018222 A1 * | 1/2009 | Klepper et al. | 518/704 |
| 2010/0242351 A1 * | 9/2010 | Causer | 44/505 |
| 2011/0154684 A1 * | 6/2011 | Lundgen et al. | 34/427 |
| 2011/0265734 A1 * | 11/2011 | Kim et al. | 122/22 |
| 2011/0314728 A1 * | 12/2011 | Camper et al. | 44/606 |

FOREIGN PATENT DOCUMENTS

| | | |
|---|---|---|
| CH | 20332 | 4/1901 |
| CH | 153757 A | 4/1932 |
| DE | 3041627 A1 | 6/1982 |
| DE | 3211590 A1 | 10/1983 |
| DE | 3502446 A1 | 7/1986 |
| DE | 3721006 C1 | 12/1988 |
| DE | 4334558 A1 | 3/1994 |
| DE | 19614689 | 10/1997 |
| DE | 19932822 A1 | 1/2001 |
| DE | 102004038730 B3 | 2/2006 |
| DE | 202007013672 U1 | 11/2007 |
| DE | 102009052902 A1 * | 10/2010 |
| DE | 102009020337 A1 | 11/2010 |
| EP | 0385514 A1 | 9/1990 |
| EP | 0385514 | 9/1992 |
| EP | 1890080 A2 * | 2/2008 |
| EP | 1990399 A1 | 11/2008 |
| EP | 2017325 A2 * | 1/2009 |
| FR | 538040 A | 6/1922 |
| FR | 574507 A | 7/1924 |
| FR | 29060 E | 5/1925 |
| FR | 686708 A | 7/1930 |
| FR | 39349 E | 10/1931 |
| FR | 839732 A | 4/1939 |
| FR | 872164 A | 6/1942 |
| FR | 881793 A | 5/1943 |
| FR | 886071 A | 10/1943 |
| FR | 906950 A | 2/1946 |
| FR | 933026 A | 4/1948 |
| FR | 953004 A | 11/1949 |
| FR | 976640 A | 3/1951 |
| FR | 977529 A | 4/1951 |
| FR | 993131 A | 10/1951 |
| FR | 55506 E | 9/1952 |
| FR | 2512053 A1 | 3/1983 |
| FR | 2525231 A1 | 10/1983 |
| FR | 2591611 A1 | 6/1987 |
| FR | 2624876 A1 | 6/1989 |
| FR | 2757097 A1 | 6/1998 |
| FR | 2786426 A1 | 6/2000 |
| FR | 2903177 A1 | 1/2008 |
| JP | 02167024 A * | 6/1990 |
| JP | 05340241 A | 12/1993 |
| JP | 2009174313 A | 8/2009 |
| NL | 1025027 C2 | 6/2005 |
| NL | 1029909 C2 | 3/2007 |
| NL | 1032001 C2 | 12/2007 |
| WO | 8905847 A1 | 6/1989 |
| WO | WO 8905847 A1 * | 6/1989 |
| WO | 2005056723 A1 | 6/2005 |
| WO | W02005056723 | 6/2005 |
| WO | 2006034581 A1 | 4/2006 |
| WO | W02006034581 | 4/2006 |
| WO | 2007078199 A1 | 7/2007 |
| WO | W02007078199 | 7/2007 |
| WO | 2007145507 A2 | 12/2007 |
| WO | W02007145507 | 12/2007 |

OTHER PUBLICATIONS

CMI, Industrial Wood Roasting, Intellectual Property Technologies. (2009).

U.S. Appl. No. 61/195,092, filed Oct. 3, 2008.

* cited by examiner

SYSTEM AND METHOD FOR PREPARATION OF SOLID BIOMASS BY TORREFACTION

CROSS-REFERENCE TO RELATED APPLICATIONS

This application claims priority under 35 U.S.C. §119(e) from copending Provisional Application Ser. No. 61/164,103, filed Mar. 27, 2009.

BACKGROUND

Renewable energy resources have been gaining prominence due to rising concerns for the environmental impact of more traditional energy sources. Renewable energy is derived from natural resources that may be replenished, unlike fossil fuels. One type of renewable resource is biomass (also referred to as biofuel), which is derived from recently living organisms, as opposed to fossil fuels derived from ancient biological sources. Biomass encompasses various plant and animal matter, including forest (woody) residues; agricultural products, such as, corn stover, straw, and grasses; wastes, e.g., biodegradable wastes or garbage; alcohol fuels; landfill gases; and other organic materials. Because biomass contains carbon, biomass may be combusted to provide energy. Unlike the combustion of fossil fuels, which releases carbon dioxide into the atmosphere that has been stored in the Earth for millions of years, the combustion of biomass releases carbon dioxide that was only recently extracted from the atmosphere, because biomass is derived from recently living organisms. Thus, biomass is essentially carbon dioxide neutral and gentler to the environment than fossil fuels.

Many types of biomass are relatively wet in their raw state for a variety of reasons. For example, various types of biomass derived from plant matter, such as, grasses, naturally absorb water. Additionally, biomass may be wet due to washing prior to combustion to reduce salt content, e.g., to reduce the corrosive effects of the biomass on a combustion chamber or to improve the quality of byproducts of combustion such as ash. Various applications employing biomass as a fuel require the biomass to be processed from a relatively wet state to a dry state, so that the biomass can be used directly in existing combustion apparatuses. A type of thermochemical treatment, known as torrefaction, can be used to convert relatively wet biomass to dry biomass. Torrefaction involves subjecting a material to a high temperature, e.g., in the range from 250-300° C. (482-572° F.) in a low-oxygen or oxygen-free gaseous environment near atmospheric pressure. The absence or near-absence of oxygen prevents the material from burning, while moisture and volatile gases in the biomass are sublimated by the heat. Torrefaction, which can be considered a mild form of pyrolysis (chemical decomposition by heating), results in chemical changes to the material that render the material easier to grind. The solid, torrefied material has a higher relative energy content than the original biomass. Additionally, because the torrefied material is hydrophobic, it is relatively resistant to rotting.

Improved techniques for torrefaction, including techniques making more efficient use of available energy resources, are desired.

SUMMARY

A method for preparing a torrefied biomass fuel begins by extracting moisture from a relatively wet biomass fuel in a biomass dryer to produce a relatively dry biomass fuel. All remaining moisture, or nearly all remaining moisture, is then extracted from the relatively biomass fuel in a final drying stage. Steam at a temperature of about 482° C. (900° F.) is used for this purpose. The resulting dried biomass fuel is conveyed downward using gravity for subsequent processing. The dried biomass fuel is torrefied (i.e., subjected to torrefaction), which produces torrefied biomass fuel and torrefaction gases. A gaseous mixture of steam and torrefaction gases is routed via ductwork to a heat exchanger. The gaseous mixture is heated via heat exchange with a flue gas, and the heated gaseous mixture is used to support the extraction of the remaining moisture in the final drying stage and to support the torrefaction of the dried biomass fuel.

Another embodiment of the present invention is a torrefaction system including a dryer, a torrefaction reactor, a combustion unit, and a heat exchanger. The dryer is configured to dry a relatively wet biomass fuel and provide a relatively dry biomass fuel as its output. The torrefaction reactor has an upper chamber and a lower chamber. The upper chamber is configured to remove all, or nearly all, moisture from the relatively dry biomass fuel in an environment containing steam at a temperature of about 482° C. (900° F.). The lower chamber is configured to torrefy dried biomass produced by the upper chamber at a temperature between about 250° C.-300° C. (482° F.-572° F.). The combustion unit is configured to combust a portion of a gaseous mixture of steam and torrefaction gases vented by the torrefaction reactor to produce a flue gas. The heat exchanger is configured to exchange heat from the flue gas to the gaseous mixture in order to provide a heated gaseous mixture for provision to the torrefaction reactor.

BRIEF DESCRIPTION OF THE DRAWINGS

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for FIG. 1 is schematic representation of one preferred embodiment of a torrefaction system formed in accordance with the present invention;

DETAILED DESCRIPTION

All references cited herein are hereby incorporated by reference in their entirety.

Figure 1:
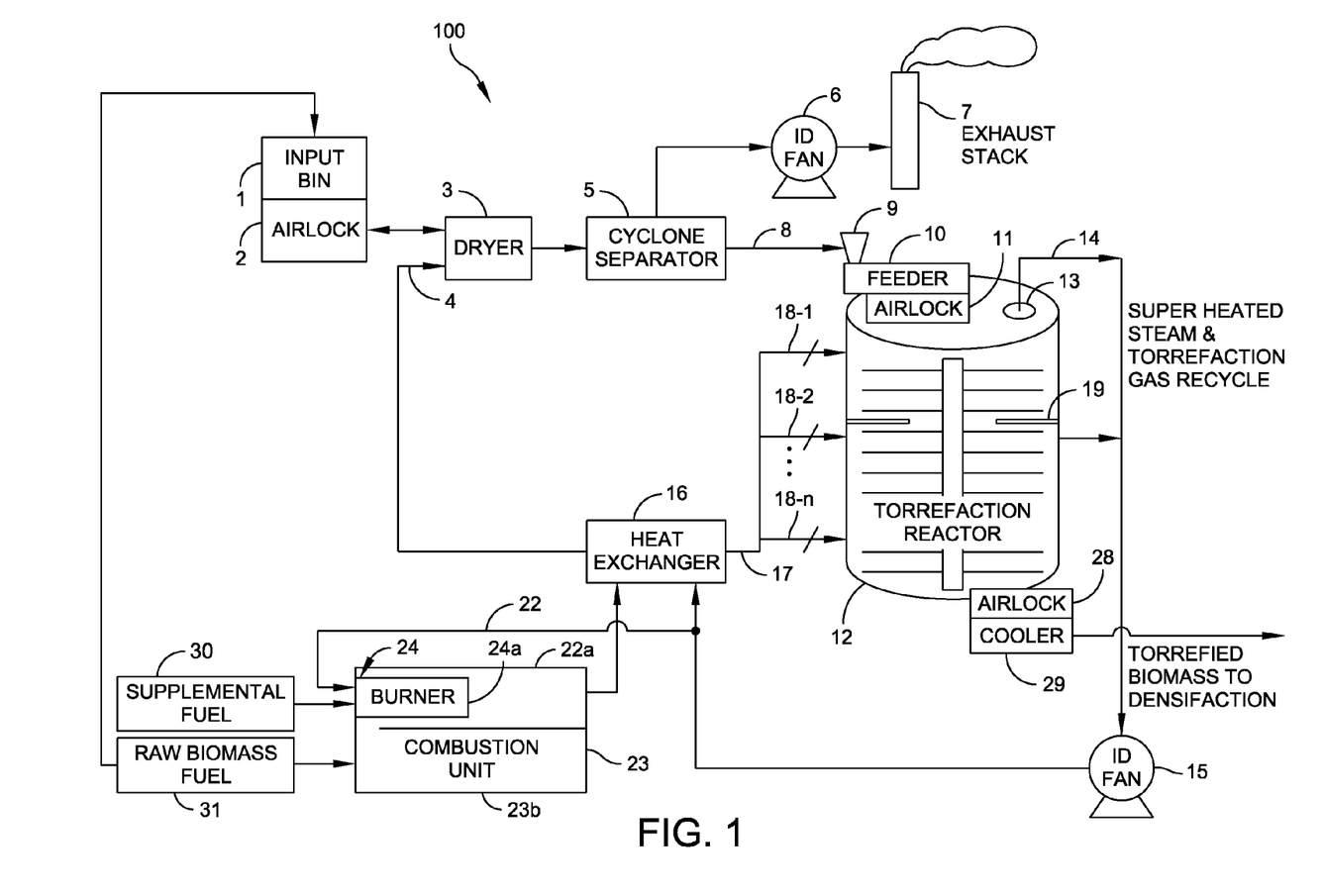

Referring to FIG. 1, a preferred embodiment of a torrefaction system 100 is fed pre-sized biomass 31 via an input bin 1 (also known as a feed hopper) coupled to an airlock 2 that feeds a dryer 3. Although not shown one of ordinary skill in the art would understand that pre-sizing of biomass 31 may be achieved by known techniques. Biomass 31 is also provided to combustion chamber 23 of torrefaction system 100 to support functionality described hereinbelow in further detail. Biomass 31 is provided to input bin 1 after initial startup of torrefaction system 100. Dryer 3 may be a rotary drum dryer, e.g., a triple-pass rotary drum dryer, or another conventional industrial dryer as is known in the art. Biomass 31 enters dryer 3 concurrently with combustion flue gas that provides the thermal energy to enable drying. The combustion flue gas is sufficiently hot to remove moisture from biomass 31 and to heat the biomass, e.g., often between 1,600° F. and 1,700° F. Dryer 3 reduces the moisture content of the biomass to a relatively low level, e.g., at or below 10% by weight. Moisture from the biomass that is vaporized in dryer 3 is transported, along with the combustion flue gas and the partially dried biomass 31, to a cyclone separator 5, which separates the moisture and combustion flue gases from biomass 31. Cyclone separation is a technique that is known in the art for separating mixtures of solids and fluids using vortex separation. An example of a cyclone separator is disclosed at U.S. Pat. No. 7,159,723, "Cyclone Separator," by T. Hilpert et al., although various types of cyclone separators may be employed. The cyclone separator 5 sends the partially dried biomass 31 to a metering bin 9 via a conveyor 8 and sends the combustion flue gas and the extracted moisture to an induction draft (ID) fan 6 (also known as an induced, or induction, air fan). ID fans 6, which are used in many industrial applications, establish sufficient negative pressure to create a suction effect. ID fan 6 sucks the combustion flue gas and moisture for expulsion, via an exhaust stack 7. Other types of fans or similar conventional equipment may be used for this purpose as well.

Partially dried biomass 31 from the metering bin is fed to a feeder 10, often a multi-screw feeder. Screw feeders are used in various industries to meter material to other processing units, and an example of a screw feeder is disclosed at U.S. Pat. No. 5,183,148, "Screw Feeder," by F. Kondo. Feeder 10 is coupled to an airlock 11 disposed at the top of a torrefaction reactor 12. Thus, partially dried biomass 31 is transported from metering bin 9 through feeder 10 and airlock 11 and deposited in torrefaction reactor 12.

Torrefaction reactor 12 may be a vertical, multi-hearth dehumidifier-type, enclosed and sealed vessel that allows for the processing of biomass in an oxygen-free (or substantially oxygen-free) environment. Adequate results have been achieved with a torrefaction reactor 12 such as the turbodryer that is commercially available from Wyssmont, Inc., of 1470 Bergen Blvd., Fort Lee, N.J. 07024. For example, torrefaction reactor 12 may be a vertical multi-tray drying and roasting (torrefying) apparatus. Biomass 31 exits airlock 11 and falls upon an uppermost tray. All the trays in torrefaction reactor 12 are attached to a rotating central shaft powered and controlled by a motor and gearbox as is known in the art. As the uppermost tray rotates, one or more stationary arms level the biomass. After a period of time, as the tray continues to rotate, one or more scraper arms slide the biomass off the tray through one or more slots, allowing the biomass to fall onto the tray directly below. In like fashion, the biomass transitions from one tray level to another until it has been transported down to the lowermost tray. Thus, the biomass is conveyed downward through the torrefaction reactor 12 by gravity. It will be understood that other mechanisms for mechanical conveyance of a material, as known to one of ordinary skill in the art, are also suitable. For example, screw-type apparatuses may be employed.

Torrefaction reactor 12 first subjects the partially dried biomass 31 to final drying in an upper chamber 12a using superheated steam. The steam is supplied by the moisture from the biomass itself. Throughout drying (and torrefaction, as described below), the biomass advantageously never comes into contact with any contaminants of combustion or other detrimental gases, liquids, or solids. The superheated steam picks up moisture from the biomass, exits torrefaction reactor 12 at port 13, and flows into ductwork 14 via suction from ID fan 15.

Torrefaction reactor 12 also vents torrefaction gases released as a result of torrefaction occurring in lower chamber 12b. A segregation barrier 19 separates upper chamber 12a from lower chamber 12b, but does not form a perfect seal. Therefore, after final drying, the fully dried biomass 31 is conveyed from upper chamber 12a to lower chamber 12b. Segregation barrier 19 enables different temperature profiles to be maintained in chambers 12a and 12b, since less energy is required to sustain torrefaction in the lower chamber 12b, than final drying in the upper chamber 12a. Thus the segregation barrier in torrefaction system 100 maintains separate temperature profiles unlike prior art systems, and therefore allows more efficient use of resources than was previously available.

In lower chamber 12b, the temperature is maintained between 250° C.-300° C. (482° F.-572° F.). Torrefaction reactor 12 has internal fans (not shown) that continuously circulate superheated steam and torrefaction gases inside both upper chamber 12a and lower chamber 12b. Although upper chamber 12a and lower chamber 12b are both maintained at roughly atmospheric pressure, lower chamber 12b is maintained at a pressure slightly lower than that of upper chamber 12a, so that any gaseous vapors which cross segregation barrier 19 flow from upper chamber 12a to lower chamber 12b, i.e., simultaneously with biomass 31. In this way, no torrefaction gases are present in the superheated steam exiting upper chamber 12a, via exit port 13, thereby promoting energy efficiency. Additionally, because relatively cool gaseous vapors from lower chamber 12b do not flow into upper chamber 12a, which is maintained at a higher temperature, additional energy expenditure is not required to maintain the temperature of upper chamber 12a.

Dried biomass 31, which is at a temperature of about 274° C. (525° F.) upon entry into lower chamber 12b, is heated further to a torrefaction temperature of between 277° C.-288°

C. (530° F.-550° F.) and held at that torrefaction temperature for the duration of the torrefaction reaction which then occurs. The torrefaction reaction that occurs as a result of exposure of the biomass to a high-temperature, near-atmospheric pressure, in a relatively anaerobic environment, chemically changes the structure of the biomass, causing it to lose mechanical strength and elasticity and to become hydrophobic. The torrefaction reaction also releases torrefaction gases, which exit torrefaction reactor 12 via ductwork 27.

ID fan 15 circulates the mixture of steam and torrefaction gases ("torrefaction gas mixture") via ductwork 21 to the input of a gas-to-gas heat exchanger 16. The gas-to-gas heat exchanger 16 heats the moisture laden superheated steam to approximately 482° C. (900° F.). The heat exchanger 16 also provides combustion flue gases to dryer 3 via ductwork 4. Upon exiting the gas-to-gas heat exchanger 16 into ductwork 17, the superheated steam is fed back to torrefaction reactor 12 via entry ports 18-1, 18-2, . . . , 18-n (generally entry ports 18) and is controlled by dampers so as to supply upper chamber 12a at about 482° C. (900° F.) while maintaining lower chamber 12b between 250° C.-300° C. (482° C.-572° F.). In this way, flow rates are controlled, the energy required for vaporization of the biomass moisture is supplied, and equilibrium is established and maintained. The overall amount of energy required for final drying is a function of the volume and temperature of the superheated steam, the volume of biomass entering torrefaction reactor 12, and the moisture content of the biomass. Thus, the superheated steam is recycled via recirculation and re-heating.

Combustion unit 23 provides the thermal energy required to support both drying (at dryer 3 and at torrefaction reactor 12) and torrefaction. Combustion unit 23 may be a Challenger® thermal combustion system commercially available from Advanced Recycling Equipment, Inc. of 850 Washington Road, St. Marys, Pa. 15857. Combustion unit 23 is a biomass combustor containing an upper chamber 23a and a lower chamber 23b. The use of two different chambers allows different materials to be combusted in different thermal environments. Combustion unit 23 may have an inlet for air (not shown) to support combustion as is known in the art. Several materials are combusted to provide a hot flue gas that exits combustion unit 23 and feeds into gas-to-gas heat exchanger 16. In lower chamber 23b, raw biomass 31 is burned to supply a portion of the energy required to support drying and torrefaction. During startup, the burning of biomass 31 in lower chamber 23b also provides heat for initial operation.

Still referring to FIG. 1, a portion of the torrefaction gas mixture is routed away from ductwork 21, via ductwork 22, to be fed into combustion unit 23 at entry point 24. The torrefaction gas mixture is injected and burned as a gaseous fuel at a gas burner 24a disposed at entry point 24 disposed at upper chamber 23a. At startup, a supplemental fuel 30 may be injected into upper chamber 23a via gas burner 24a to supplement thermal energy production. The torrefaction gas mixture is kept in upper chamber 23a, which is held at about 871° C. (1600° F.), for sufficient time to allow for the thermal oxidation of all volatile organic compounds, particulates, and other hydrocarbons produced by the rapid burning of raw biomass that occurs in lower chamber 23b. Upper chamber 23a is dimensioned to achieve such oxidation. In this way, the hot flue gas exiting upper chamber 23a is relatively clean, comprising principally hot water vapor and carbon dioxide. During steady state operation, i.e., after initial startup, and after operation has stabilized, the burning of the torrefaction gas mixture supplies the vast majority of the energy required for drying and torrefaction. Because the majority of the moisture contained in the raw biomass has been previously removed in dryer 3, the quality of the torrefaction gas mixture is much higher than it would otherwise be. In other words, the combination of initial drying at dryer 3 and recycling of the torrefaction gases produced during torrefaction results in a higher quality hot flue gas for sustenance of drying and torrefaction than is found in conventional systems.

Upon torrefaction, the biomass exits lower chamber 12b of torrefaction reactor 12 at the bottom through an airlock system 28. The torrefied biomass at this point is very hot and is processed through an in-line cooler 29 prior to densification according to known techniques (not shown). A conventional heat exchanger, as known to one of ordinary skill in the art, may be used as heat exchanger 16.

Figure 2:
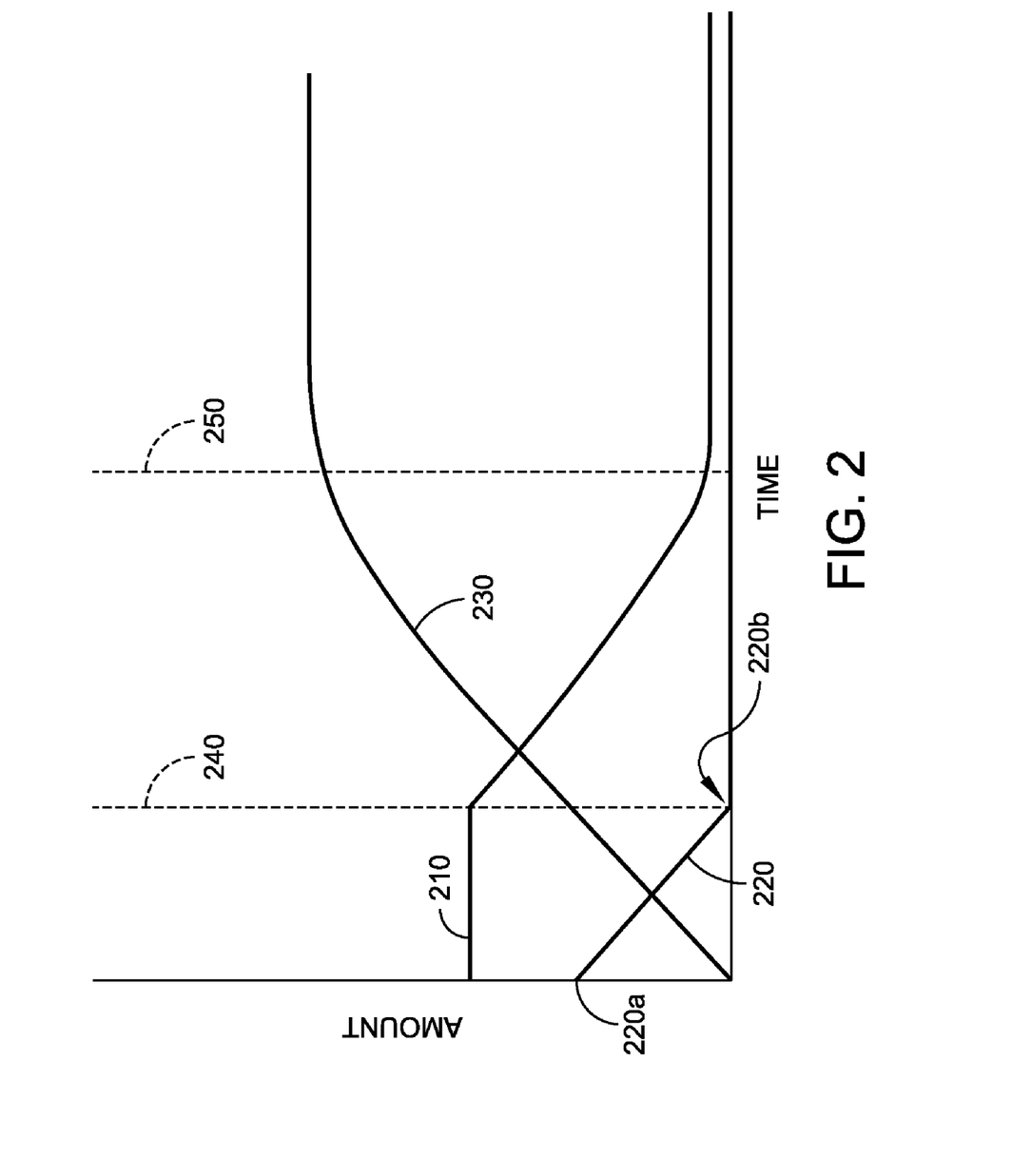
FIG. 2 is a graphical representation of the utilization of resources required to maintain drying and torrefaction in accordance with an embodiment of the present invention.

FIG. 2 depicts the utilization of resources required to maintain drying and torrefaction in accordance with an embodiment of the present invention, by relating the relative amounts of biomass 210, supplemental fuel 220, and torrefaction gas mixture 230 that are combusted in combustion unit 23. At startup, combustion unit 23 is brought up to full operating temperature, i.e., about 871° C. (1600° F.) in upper chamber 23a, using a maximum amount of biomass 220a in lower chamber 23a. The thermal energy from the biomass burning in lower chamber 23b may be insufficient to provide the total amount of energy required for startup. Therefore, supplemental fuel 220 may be injected into upper chamber 23b, via gas burner 24a, at point 24 or another burner and fed at a rate 220 to provide sufficient thermal energy to achieve successful startup. The supplemental fuel may be natural gas or another fuel. After torrefaction reactor 12 is heated to the appropriate torrefaction temperature, biomass 31 is fed to input bin 1. As biomass 31 is dried and the torrefaction reaction begins in torrefaction reactor 12, where torrefaction gases are generated. These gases are circulated and mixed with superheated steam and provided to upper chamber 23a of combustion unit 23. As the amount of torrefaction gas mixture 230 provided for combustion increases, the amount of supplemental fuel 220 decreases proportionally.

The amount of supplemental fuel 220 required is minimized after a period of time, indicated by the intersection of dashed line 240 and point 220b in FIG. 2. The amount of torrefaction gas mixture available continues to increase, and as this occurs, the amount of biomass 210 being used as fuel in lower chamber 23b decreases. At a point in time, indicated by dashed line 250 in FIG. 2, the amount of torrefaction gas provided for combustion levels off, the amount of biomass 210 being used as fuel is minimized, and the total energy supplied by combustion unit 23 is at equilibrium with the thermal energy demanded by the drying and torrefaction operations. In other words, at steady state, the sum of the quantities depicted in FIG. 2 corresponds to the amount of thermal energy needed to sustain drying and torrefaction. Thus, a significant advantage of the design of the presently disclosed torrefaction system 100 is the capability to minimize the external fuel, supplemental natural gas and biomass, needed for operation. A further advantage is that the combustion in very hot upper chamber 23a fully destroys all organic compounds that are generated during torrefaction and that are present in the torrefaction gas mixture. Yet another advantage is that torrefaction system 100 is autothermic, meaning that sufficient volumes of torrefaction gas are produced, having sufficient energy content, to support drying and torrefaction without the need for any appreciable amount of external fuel other than at startup. The combination of torrefaction reactor 12 with combustion unit 23 provides special functionality due to the efficient re-use of torrefaction gases.

Figure 3:
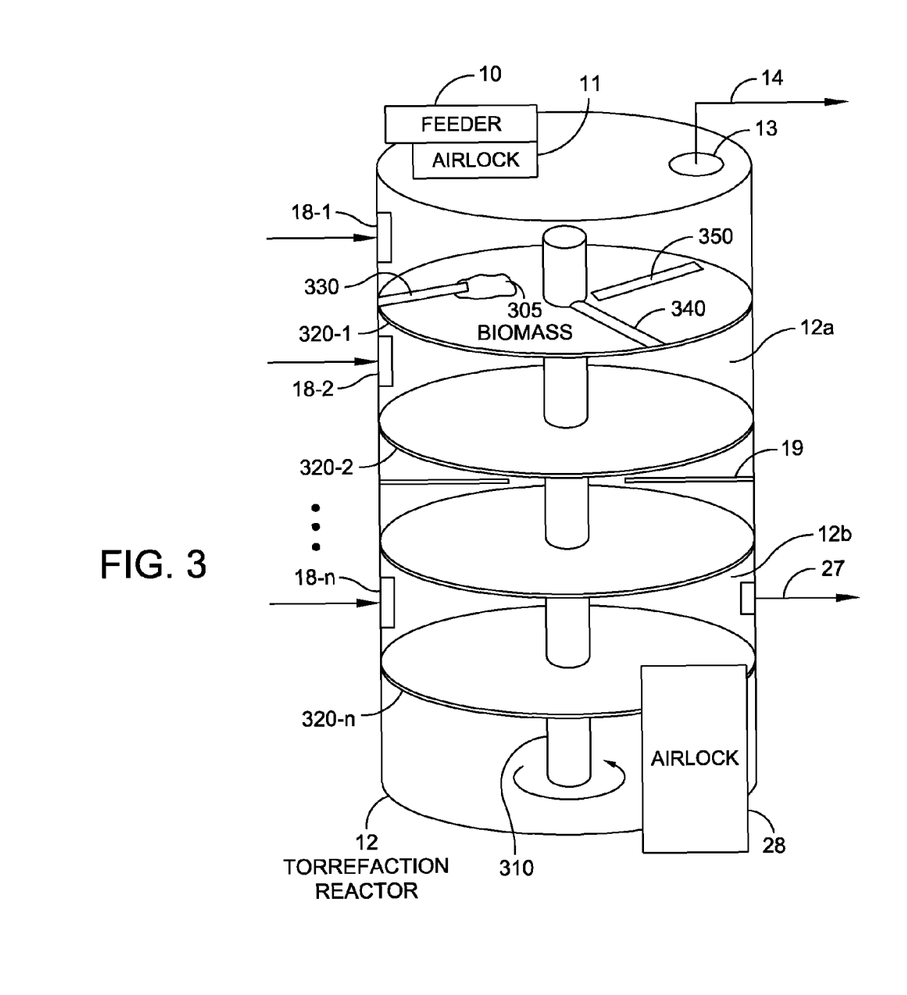
FIG. 3 is a perspective view of a torrefaction reactor in accordance with an embodiment of the present invention.

FIG. 3 is a perspective view of a torrefaction reactor in accordance with an embodiment, e.g., as in FIG. 1. The functionality of a torrefaction reactor regarding final drying, torrefaction, and input and output of gases and biomass was discussed above. FIG. 3 shows an example implementation for conveying biomass downward through upper chamber 12a and then lower chamber 12b. In FIG. 3, like numbers are attached to components previously presented in the context of FIG. 1, and such components do not require further description. Torrefaction reactor 12 as shown in FIG. 3 comprises a central rotating shaft 310 to which are attached multiple horizontally oriented trays 320-1, 320-2, . . . , 320-n (collectively trays 320) in a stacked configuration. Partially dried biomass 305 enters upper chamber 12a of torrefaction reactor 12 via an airlock 11, as described above. The biomass 305 falls on an uppermost tray 320-1. As the uppermost tray 320-1 rotates, a stationary arm 330 levels the biomass. Although one stationary arm is depicted in FIG. 3, multiple stationary arms may be used for leveling. As the uppermost tray 320-1 continues to rotate, a scraper arm 340 contacts the biomass 305 and causes it to slide through a slot 350 to fall to the tray 320-2 directly below. Multiple scraper arms and/or slots may be employed for this purpose. The downward conveyance of the biomass continues via successive trays 320 until the biomass has been transported down to the lowermost tray 320-n, at which point the biomass has been torrefied. An airlock system 28 as is known in the art provides for exit of the torrefied biomass from the torrefaction reactor 12.

Figure 4:
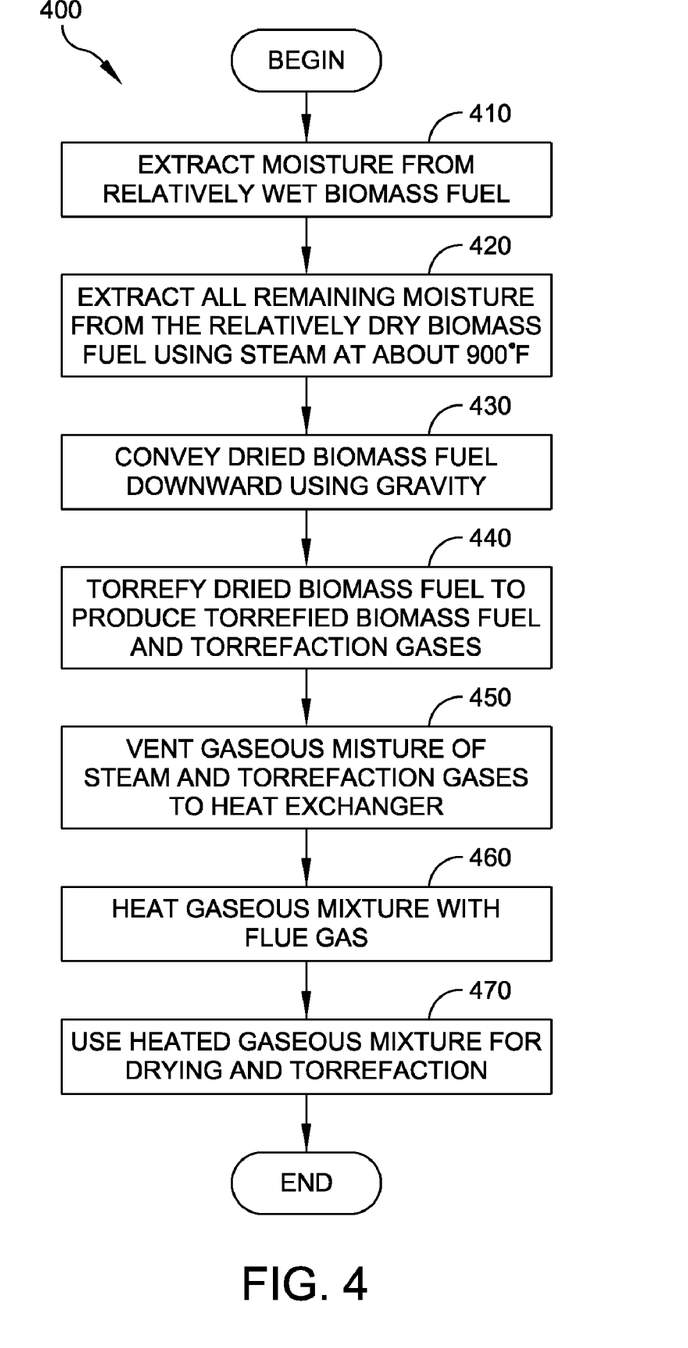
FIG. 4 is a flow diagram for a preferred method embodiment in accordance with the present invention.

FIG. 4 is a flow diagram for a preferred method embodiment that is a method of preparing a torrefied biomass fuel. After process 400 begins, moisture is extracted (410) from relatively wet biomass fuel. In other words, the relatively wet biomass fuel is dried to a relative extent, e.g., leaving about 10% residual moisture in an embodiment. Steam at a temperature of about 482° C. (900° F.) is then used to extract all remaining moisture (420) from the relatively dry biomass fuel. In other words, steam is used for a final drying stage. The resulting dried biomass fuel is conveyed downward using gravity (430) and torrefied (440) to produce torrefied biomass fuel and torrefaction gases. A mixture of steam and torrefaction gases is vented (450) to a heat exchanger. The gaseous mixture is heated (460) with flue gas, and the resulting heated gaseous mixture is used (470) to support drying and torrefaction.

Figure 5:
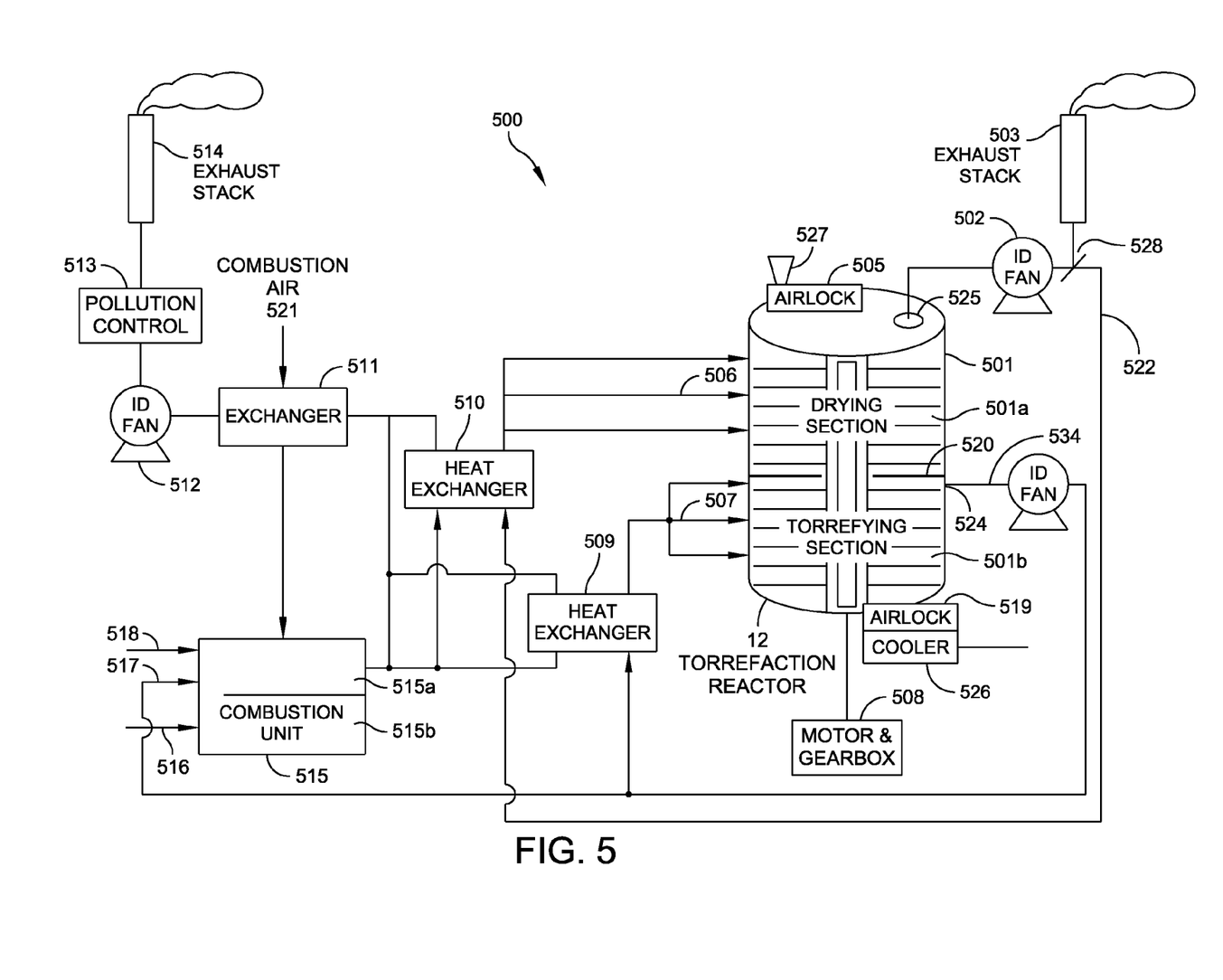
FIG. 5 is an illustration of another embodiment of a torrefaction system.

Referring to FIG. 5, another embodiment of the invention provides a torrefaction system 500 that does not use a separate dryer upstream of a torrefaction reactor, and two heat exchangers are used instead of one, to separately heat the upper and lower chambers of the torrefaction reactor. Torrefaction system 500 is otherwise similar to torrefaction system 100. More particularly, torrefaction system 500 introduces pre-sized biomass into a metering bin 527 atop an airlock 505 that feeds into the top of a torrefaction reactor 501. Torrefaction reactor 501 may be a multi-tray vertical turbodryer, e.g., as commercially available from Wyssmont, Inc. of Fort Lee, N.J. Torrefaction reactor 501 has an upper chamber 501a that may be referred to as a drying section and a lower chamber 501b that may be referred to as a torrefying section. The biomass enters upper chamber 501a of torrefaction reactor 501 on an uppermost tray operating in a superheated steam environment in the absence or near-absence of oxygen. The superheated steam heats the biomass and vaporizes the moisture therein. Torrefaction reactor 501 has internal fans (not shown) that continuously circulate the superheated steam inside the drying section. The supply of super heated steam is continuously replenished.

The superheated steam exits torrefaction reactor 501 at exit point 525. Upon exit from torrefaction reactor 501, the steam, now heavily laden with moisture, flows into ductwork 535 and is drawn by suction produced by an induced draft (ID) fan 502. Induced draft fan 502 propels the steam and moisture through additional ductwork containing a damper control valve 528 that causes some of the moisture laden steam to exit into the atmosphere, via an exhaust stack 503, while allowing a portion of the remaining moisture laden steam to pass into additional ductwork 522 that transports the steam into the input of a gas-to-gas heat exchanger 510. Gas-to-gas heat exchanger 510 heats the moisture laden super heated steam to approximately 432° C. (810° F.). Upon exiting from gas-to-gas heat exchanger 510, via ductwork 529, the superheated steam is transferred back into dryer section 501a at multiple entry points collectively shown as 506 in FIG. 5. Heated gas flows through each of multiple entry points 506 and is controlled by a multiple damper system. In this way flow rates are controlled and the energy required for vaporization of the biomass moisture is supplied and equilibrium is established and maintained. The overall amount of energy required for rapid drying is a function of the volume and temperature of the super heated steam recycle gas stream, the volume of biomass entering the drying section, and its moisture content.

The entire drying process can generally be described as the heating of the biomass using superheated steam with the steam supplied by the moisture from the biomass itself in an oxygen free environment. Advantageously, the biomass never comes into contact with any contaminants of combustion or other detrimental gases, liquids, or solids. As the biomass is being dried, it is transferred downward from one tray to the next through the drying section of torrefaction reactor 501. Positioned at the bottom of the drying section is a segregation barrier 520. As in the preferred embodiment, the segregation barrier 520 is not a perfect seal and therefore allows the transfer of the now dried biomass into torrefaction section 501b of torrefaction reactor 501. Even though both sections of torrefaction reactor 501 operate at approximately atmospheric pressure, torrefaction section 501b is maintained at a pressure just slightly below that of drying section 501a so that any gaseous vapors which traverse the segregation barrier go from upper drying section 501a into torrefaction section 501b. In this way, no torrefaction gases are present in the superheated steam exiting drying section 501a via exit port 525 nor escape into the atmosphere via steam discharge stack 503.

The dried biomass enters the top of the torrefaction section 501b at approximately 260° C. (500° F.). The torrefaction section 501b raises the temperature of the dried biomass to the torrefaction temperature of between 277° C.-288° C. (530° F.-550° F.) and holds it at that temperature for the duration of the then occurring torrefaction reactions. The torrefaction reactions result in the release of torrefaction gases which mix with the super heated steam and exit the torrefaction section 501b of torrefaction reactor 501 at exit port 524. The superheated steam and torrefaction gas mixture move into ductwork 534, which is influenced by the suction of ID fan 504. ID fan 504 discharges into ductwork 523, through which the superheated steam and torrefaction gas mixture is transferred to the inlet of a gas-to-gas heat exchanger 509. Prior to entering the gas-to-gas heat exchanger 509, a portion of the superheated steam and torrefaction gas mixture is diverted from ductwork 523 and directed to biomass combustion unit 515 at exit point 531. The gas mixture is rich in torrefaction gas and is used to supply gaseous fuel to the combustion unit, reducing the need for a significant portion of the energy to be supplied by the biomass fuel or by any other supplemental fuel. The torrefaction gas mixture enters the upper chamber of the biomass combustion unit 515a with the use of an appropriate gas burner unit (not shown) at entry point 517.

The remainder of the superheated steam and torrefaction gas mixture is recycled back to the torrefaction section 501b of the torrefaction reactor 501 via heat exchanger 509, where the mixture is re-heated to between 288° C.-343° C. (550° F.-650° F.). Upon exiting gas-to-gas heat exchanger 509 via ductwork 530, the reheated super heated steam and torrefaction gas mixture is routed back to and enters torrefaction section 501b via multiple entry points collectively shown as 507, each entry point being controlled by a separate damper system, thus supplying the energy required to maintain the torrefaction reaction. In this way, the flow of the gas mixture is controlled, and the torrefaction energy requirement is balanced with the energy demand, thus establishing and maintaining equilibrium.

A combustion unit 515 is the source of the thermal energy required to support both drying and torrefaction. The combustion unit 515 may be a Challenger® thermal combustion system commercially available from Advanced Recycling Equipment, Inc. of 850 Washington Road, St. Marys, Pa. 15857, with functionality similar to combustion unit 23. Raw biomass is burned in a lower chamber 515b to supply some of the energy to support drying and torrefaction. One purpose of an upper chamber 515a, which is held at about 927° C. (1700° F.), is to provide sufficient residence time to allow for complete thermal oxidation of all organic particulates and hydrocarbons which result from the rapid burning of raw biomass as is occurring in lower chamber 515b. In this way, the flue gas exiting upper chamber 515a is extremely clean, containing mainly very hot water vapor and carbon dioxide. A second use of upper chamber 515a is that a gas burner (not shown) may be placed near the head located at entry point 517, where the torrefaction gas is injected and burned. The burning of torrefaction gas upon steady state operation supplies the vast majority of the total energy required to sustain the drying and torrefaction operations. Since the majority of the moisture contained in the raw biomass feedstock has been previously removed in the drying section 501a of torrefaction reactor 501, the quality of the torrefaction gas is much higher than it would otherwise be.

Upon startup, combustion unit 515 is brought up to full operation using a maximum amount of biomass in lower chamber 515b. The thermal heat energy from the biomass burning in the lower chamber is insufficient to provide the total amount of energy required for startup. Therefore, natural gas or some other supplemental fuel is injected into upper chamber 515a via the torrefaction gas burner or another burner and fed at a rate to provide sufficient thermal energy to achieve successful startup of the system. After torrefaction reactor 501 is heated to the appropriate drying and torrefaction temperatures, the biomass is provided as input via upper airlock 505. As the biomass is dried and torrefaction reactions begin in the torrefaction section, torrefaction gas is generated. The torrefaction gas is circulated as described earlier, and begins to be fed into upper chamber 515a of combustion unit 515 at entry point 517. As the amount of torrefaction gas increases, the amount of supplemental fuel (natural gas or equivalent) is decreased proportionally. At some point, supplemental fuel 518 is shutoff. The availability of torrefaction gas continues to increase and as this occurs, the amount of biomass 516 being used as fuel in the lower chamber is decreased. At a certain, predetermined point, the amount of torrefaction gas levels off, the biomass being used as fuel is trimmed to a minimum, and the total energy being supplied by the combustion unit is in equilibrium with the thermal energy demand of the drying and torrefaction operations. Again, a significant advantage of this system design is its ability to minimize the external fuel (supplemental natural gas and biomass) needed for operation. A final advantage of the very hot upper chamber 515a is that it substantially destroys all the organic compounds which are generated during torrefaction and are present in the torrefaction gas.

The hot flue gas exiting from upper chamber 515a is routed through ductwork into heat exchangers 509 and 510 in parallel. In addition, a flue gas bypass subsystem including ductwork and damper system 533 is included. Flue gas flows through each gas-to-gas heat exchanger and is controlled using dampers strategically located in the ductwork system. The flue gas, upon exiting from the gas-to-gas heat exchangers, is recombined and enters a combustion air pre-heater 511 that receives combustion air 521. Pre-heating combustion air 521 significantly increases the overall efficiency of the combustion system. Upon exiting the combustion air pre-heater, the flue gas is processed through ID fan 512 and exhausted to pollution control equipment 513, as known conventionally in the art, and released into the atmosphere by way of exhaust stack 514.

The torrefied biomass exits the torrefaction section 501b of torrefaction reactor 501 at the bottom, through airlock system 519. The torrefied biomass at this point is very hot and is processed through an in-line cooler 526 prior to densification (not shown).

The embodiments and examples set forth herein are presented to best explain the present disclosure and its practical application and to thereby enable those skilled in the art to make and utilize the present disclosure. However, those skilled in the art will recognize that the foregoing description and examples have been presented for the purpose of illustration and example only. Thus, while preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A torrefaction system comprising:
   a dryer configured to dry a relatively wet biomass fuel and provide a relatively dry biomass fuel;
   a torrefaction reactor comprising:
      an upper chamber configured to remove all moisture from the relatively dry biomass fuel in an environment containing steam, and
      a lower chamber configured to torrefy dried biomass produced by the upper chamber at a temperature between about 250° C.-300° C. (482° F.-572° F.);
   a combustion unit configured to combust a portion of a gaseous mixture of steam and torrefaction gases vented by the torrefaction reactor to produce a flue gas; and
   a heat exchanger configured to exchange heat from the flue gas to the gaseous mixture to provide a heated gaseous mixture for provision to the torrefaction reactor.

2. The torrefaction system of claim 1, wherein the torrefaction reactor further includes a segregation barrier configured to maintain different thermal profiles in the upper chamber and the lower chamber.

3. The torrefaction system of claim 2, wherein the segregation barrier is further configured to enable co-current flow of gases from the upper chamber of the torrefaction reactor to the lower chamber.

4. The torrefaction system of claim 1, wherein the torrefaction reactor further comprises entry ports coupled to a damper system, the damper system configured to supply and maintain a gas mixture temperature in the upper chamber with the temperature in the lower chamber between about 250° C.-300° C. (482° F.-572° F.).

5. The torrefaction system of claim 1, wherein the combustion unit comprises:
 an upper chamber configured to combust the gaseous mixture and a supplemental fuel to produce the flue gas; and
 a lower chamber configured to combust a portion of the relatively wet biomass fuel to support production of the flue gas in the upper chamber.

6. The torrefaction system of claim 1, wherein the dryer is a triple pass rotary drum dryer.

7. The torrefaction system of claim 6, wherein the dryer is configured to remove about 80% of the moisture from the relatively wet biomass fuel.

* * * * *